(12) United States Patent
Timmermans

(10) Patent No.: US 7,907,722 B2
(45) Date of Patent: Mar. 15, 2011

(54) PROTECTION AGAINST POWER ANALYSIS ATTACKS

(75) Inventor: Daniel Timmermans, Eindhoven (NL)

(73) Assignee: NXP B.V., Eindhoven (NL)

( * ) Notice: Subject to any disclaimer, the term of this patent is extended or adjusted under 35 U.S.C. 154(b) by 464 days.

(21) Appl. No.: 10/587,727

(22) PCT Filed: Jan. 21, 2005

(86) PCT No.: PCT/IB2005/050254
§ 371 (c)(1),
(2), (4) Date: Jul. 26, 2006

(87) PCT Pub. No.: WO2005/073825
PCT Pub. Date: Aug. 11, 2005

(65) Prior Publication Data
US 2007/0160196 A1   Jul. 12, 2007

(30) Foreign Application Priority Data

Jan. 27, 2004   (EP) .................................... 04100279

(51) Int. Cl.
*H04L 9/28* (2006.01)
*H04L 9/06* (2006.01)
*H04L 9/00* (2006.01)

(52) U.S. Cl. ................... 380/28; 380/29; 380/30; 380/2; 380/1; 713/189; 713/188; 713/187; 726/26

(58) Field of Classification Search ......................... None
See application file for complete search history.

(56) References Cited

U.S. PATENT DOCUMENTS

| | | | |
|---|---|---|---|
| 6,419,159 B1 * | 7/2002 | Odinak .......................... | 235/492 |
| 6,654,884 B2 * | 11/2003 | Jaffe et al. ..................... | 713/168 |
| 6,748,535 B1 * | 6/2004 | Ryan et al. .................... | 713/189 |
| 6,766,455 B1 * | 7/2004 | Ryan, Jr. ....................... | 713/189 |
| 7,613,763 B2 * | 11/2009 | Elbe et al. ..................... | 708/710 |
| 7,757,083 B2 * | 7/2010 | Devadas et al. ............... | 713/168 |
| 2003/0194086 A1 * | 10/2003 | Lambert ......................... | 380/44 |
| 2005/0055596 A1 * | 3/2005 | Abe et al. ..................... | 713/500 |
| 2005/0089060 A1 * | 4/2005 | Vergnes ........................ | 370/463 |
| 2005/0134319 A1 * | 6/2005 | Bock ............................. | 326/104 |
| 2005/0147243 A1 * | 7/2005 | Baek .............................. | 380/28 |
| 2006/0261858 A1 * | 11/2006 | Manfred ....................... | 326/105 |
| 2009/0222672 A1 * | 9/2009 | Clarke et al. ................. | 713/189 |

OTHER PUBLICATIONS

IEEE Transaction; "High Level Side-Channel Attack Modelling and Simulation forSecurity-Critical Systems on Chips", F.Menichelli et al; 2008.*

Irwin J. et al: "Instruction Stream Mutation for Non-Deterministic Processors"; Proceedings of the IEEE International Conference on Application-Specific Systems, Architectures, and Processors; 2002; pp. 286-295.

* cited by examiner

*Primary Examiner* — Syed A. Zia

(57) ABSTRACT

An electronic circuit for cryptographic processing, comprising a first combinatorial logical circuit, arranged to perform a first set of logical operations on input data and to produce output data, the output data having a functional relation to the input data, further comprising at least a second combinatorial logical circuit, arranged to perform a second set of logical operations on the same input data and to produce output data, the output data having an identical functional relation to the input data, wherein the first set of logical operations is different from the second set of logical operations, and wherein the electronic circuit is arranged to dynamically select one combinatorial logical circuit, of a set comprising at least the first combinatorial logical circuit and the second combinatorial logical circuit, for performing logical operations on the input data and producing output data.

21 Claims, 5 Drawing Sheets

PROTECTION AGAINST POWER ANALYSIS ATTACKS

TECHNICAL FIELD

This invention relates to an electronic circuit for cryptographic processing, having a set of combinatorial logical circuits, the set of combinatorial logical circuits comprising a first combinatorial logical circuit, arranged to perform a first set of logical operations on input data and to produce output data, the output data having a functional relation to the input data.

This invention further relates to an electronic circuit for cryptographic processing, comprising a combinatorial logical circuit arranged to perform logical operations on input data and to produce output data, and a storage element for storing output data produced by the combinatorial logical circuit.

This invention further relates to a method of processing cryptographic data, comprising:
  using of a first set of logical operations for processing input data and producing output data, the output data having a functional relation to the input data.

This invention further relates to a method of processing cryptographic data, comprising:
  using a set of logical operations for processing input data and producing output data,
  storing the output data in a storage element.

BACKGROUND ART

Cryptographic devices are used for the protection of information against unauthorized access to or modification of this information, whether in storage, processing or transit, and against the denial of service to unauthorized users. Examples of cryptographic devices are smart cards, secure identity tokens, mobile phone security systems, electronic purses, television de-scrambling devices, to name a few. Differential power analysis (DPA) is an established technique for retrieving information from cryptographic systems. The principle of differential power analysis is that the power consumption of a cryptographic device is measured, and this information is correlated with the behavior of logical gates and software running on the cryptographic device. By using suitable statistical techniques on a large set of power consumption profiles, secret parameters can be derived, such as the users private key. Simple Power Analysis (SPA) is a simpler form of the attack that does not require statistical analysis. Besides the power consumption of a cryptographic device, also its electromagnetic radiation can be measured in order to derive secret parameters. Examples of the use of such secret parameters are encrypting or decrypting arbitrary data, authenticating commands or requests, to name a few. The total amount of energy that is consumed by a cryptographic device is a combination of the contribution from many individual circuit elements. In case a single bit in the input to a computation changes, it influences the inputs and outputs of many logical gates through which the computation path flows. In general, a combinatorial logical circuit implements a number of logical operations. These logical operations include the AND, OR and NOT operation, which are basic logical operations. Other logical operations are XOR, binary addition, multiplexing, binary subtraction, amongst others, which can all be derived from basic logical operations.

In "Energy-Aware Design Techniques for Differential Power Analysis Protection", Proceedings Design Automation Conference, 2003, page 36-41, 2-6 Jun. 2003, Benini et al. describe a cryptographic device having a first execution unit that implements all required functionality, and a second execution unit that only implements a part of the functionality of the first execution unit. Input data are either processed by the first execution unit or by the second execution unit. Due to the reduced functionality of the second execution unit, its power consumption is lower than that of the first execution unit, for a given input value. A selector determines which execution unit to activate in a given cycle, based on the observation of the input value, in order to alter the power consumption of the cryptographic device over time.

Irwin, J. et al., in "Instruction Stream Mutation for Non-Deterministic Processors", Proceedings of the IEEE International Conference on Application-Specific Systems, Architectures, and Processors, 2002, page 286-295, describe a non-deterministic processor having a so-called mutation unit that is located directly before the execution unit in the pipeline of the processor. The unit may therefore examine and operate on each instruction before dispatching it to the execution unit, using information on the liveness status of values in physical registers, stored in a dedicated table. Using this information, the mutation unit can verify which registers contain useful values and which registers contain values that may be overwritten. One operation performed by the mutation unit is to alter the instructions such that their meaning is the same while their register usage and mapping is different, using the concept of identity instructions. In this concept an instruction is added to an original instruction, such that the sequence of instructions has the same meaning as the original instruction, but having a different power consumption. As long as an identity for a given instruction is available, the processor may decide at random to forward either the identity sequence or the original instruction to the execution unit.

It is a disadvantage of the prior art electronic circuits for cryptographic processing that it is not possible to vary the power consumption of the circuit over time independent of both the value of the input data as well as the instructions that are executed.

DISCLOSURE OF INVENTION

It is an object of the invention to provide an electronic circuit for cryptographic processing that allows varying the level of power consumption over time when processing identical input data, independent of the value of the input data. It is a further object of the invention to provide an electronic circuit for cryptographic processing that allows varying the level of power consumption over time when processing identical input data without the need to add additional instructions to the instruction set.

This object is achieved with an electronic circuit according to the invention, characterized in that in that the set of combinatorial logical circuits further comprises at least a second combinatorial logical circuit, arranged to perform a second set of logical operations on the same input data and to produce output data, the output data having an identical functional relation to the input data, wherein the first set of logical operations is different from the second set of logical operations, and wherein the electronic circuit is arranged to dynamically select one combinatorial logical circuit of the set of combinatorial logical circuits for performing logical operations on the input data and producing output data. It is noted that the term logical operations includes arithmetic operations, as at the lowest physical level arithmetic operations are also implemented by logical gates, i.e. transistors. Input data are processed by either one of the at least two combinatorial logical circuits that implement the same functional behavior by using a different set of logical operations. By switching between the combinatorial logical circuits during processing of data, it will be much harder to derive information from measured power consumption profiles, since these profiles are different for the different combinatorial logical circuits, even when processing identical input data. In this way the level of protection of the electronic circuit against power analysis attacks is dramatically increased. As the logical circuit itself implements the different sets of logical operations, no changes to the instruction set architecture are required.

An embodiment of the invention is characterized in that the electronic circuit comprises at least a first set of combinatorial logical circuits and a second set of combinatorial logical circuits, and is arranged to use output data produced by the first set of combinatorial logical circuits as input data of the second set of combinatorial logical circuits. An advantage of this embodiment is that for a given combinatorial logical circuit the number of different power consumption profiles, for given input data, considerably increases, due to dividing the logical circuit into several layers, where the power consumption profile of each layer can be varied independently of the other layers.

An embodiment of the invention is characterized in that the electronic circuit further comprises a selection circuit arranged for generating a signal to select one combinatorial logical circuit of the set of combinatorial logical circuits, a splitter circuit arranged for inputting the input data to one combinatorial logical circuit of the set of combinatorial logical circuits, depending on the signal, a merger circuit arranged for outputting the output data from one combinatorial logical circuit of the set of combinatorial logical circuits, depending on the signal. By using the selection circuit, the splitter circuit and the merger circuit, it is relatively easy to dynamically choose the flow of input data to go through one of the logical circuits.

An embodiment of the invention is characterized in that the electronic circuit further comprises a timing circuit arranged to determine the points in time at which the selection circuit generates the signal to select one combinatorial logical circuit of the set of combinatorial logical circuits. An advantage of this embodiment is that it can be easily used in both locally and globally clocked systems.

According to the invention, the object described above can also be obtained by the subject matter of claim 5. Encoding data prior to storage in the storage element, results in a different power consumption profile when compared to not encoding these data. In case an encoded output value is stored, this value is decoded when retrieved from the storage element, i.e. the functional behavior of the electronic circuit is not changed. By switching between encoding and not encoding output data before storing in the storage element, it is much harder to derive information from measured power consumption profiles, since these profiles are different when storing data in the storage element, even when storing identical data.

An embodiment of the invention is characterized in that the electronic circuit further comprises a second set of an encoding means and a corresponding decoding means, arranged for encoding second output data before storing the second output data in the storage element and decoding the second output data after retrieving the second output data from the storage element, respectively, wherein the encoding of the first output data is different from the encoding of the second output data, and wherein the electronic circuit is further arranged to dynamically select one set of an encoding means and a corresponding decoding means, of a set comprising at least the first set of an encoding means and a corresponding decoding means and the second set of an encoding means and a corresponding decoding means, for encoding and decoding of the output data. By adding more sets of encoding and decoding means, the number of different power consumption profiles for storing identical output data is increased, improving the level of protection against retrieval of information from the electronic circuit by using information on power consumption profiles.

An embodiment of the invention is characterized in that the electronic circuit further comprises a timing circuit arranged to determine the points in time at which the electronic circuit selects one set of an encoding means and a corresponding decoding means, of a set comprising at least the first set of an encoding means and a corresponding decoding means and the second set of an encoding means and a corresponding decoding means. An advantage of this embodiment is that it can be easily used in both locally and globally clocked systems.

An embodiment of the invention is characterized in that the combinatorial logical circuit comprises a first combinatorial logical circuit and at least a second combinatorial logical circuit, the first combinatorial logical circuit arranged to perform a first set of logical operations on input data and to produce output data, the output data having a functional relation to the input data, the second combinatorial logical circuit arranged to perform a second set of logical operations on the same input data and to produce output data, the output data having an identical functional relation to the input data, wherein the first set of logical operations is different from the second set of logical operations, and wherein the electronic circuit is arranged to dynamically select one combinatorial logical circuit, of a set comprising at least the first combinatorial logical circuit and the second combinatorial logical circuit, for performing logical operations on the input data and producing output data. An advantage of this embodiment is that it combines the protection against power analysis attacks obtained from processing input data by either one of the at least two combinatorial logical circuits, as well as by randomly encoding output data before storing in the storage element, both without changing the functional behavior of the electronic circuit. As a result, the level of protection against power analysis attacks dramatically increases.

According to a further aspect of the invention, a method for processing data is characterized in that the method further comprises:

using a second set of logical operations for processing the same input data and producing output data, the output data having an identical functional relation to the input data, wherein the first set of logical operations is different from the second set of logical operations, dynamically selecting a set of logical operations, of a set comprising at least the first set of logical operations and the second set of logical operations, for processing the input data.

By switching between the two sets of logical operations during processing of data, it will be much harder to derive information from measured power consumption profiles, since these profiles are different for the different sets, even when processing identical input data, while the functional behavior of the electronic circuit is not changed.

According to the invention, the object described above can also be obtained by the subject matter of claim 10. By switching between encoding and not encoding output data before storing in the storage element, it is much harder to derive information from measured power consumption profiles, since these profiles are different when storing data in the storage element, even when storing identical data, while the functional behavior of the electronic circuit is not changed.

A cryptographic device comprising an electronic circuit according to the invention is defined in claim 11.

SHORT DESCRIPTION OF FIGURES

DESCRIPTION OF EMBODIMENTS

Figure 1:
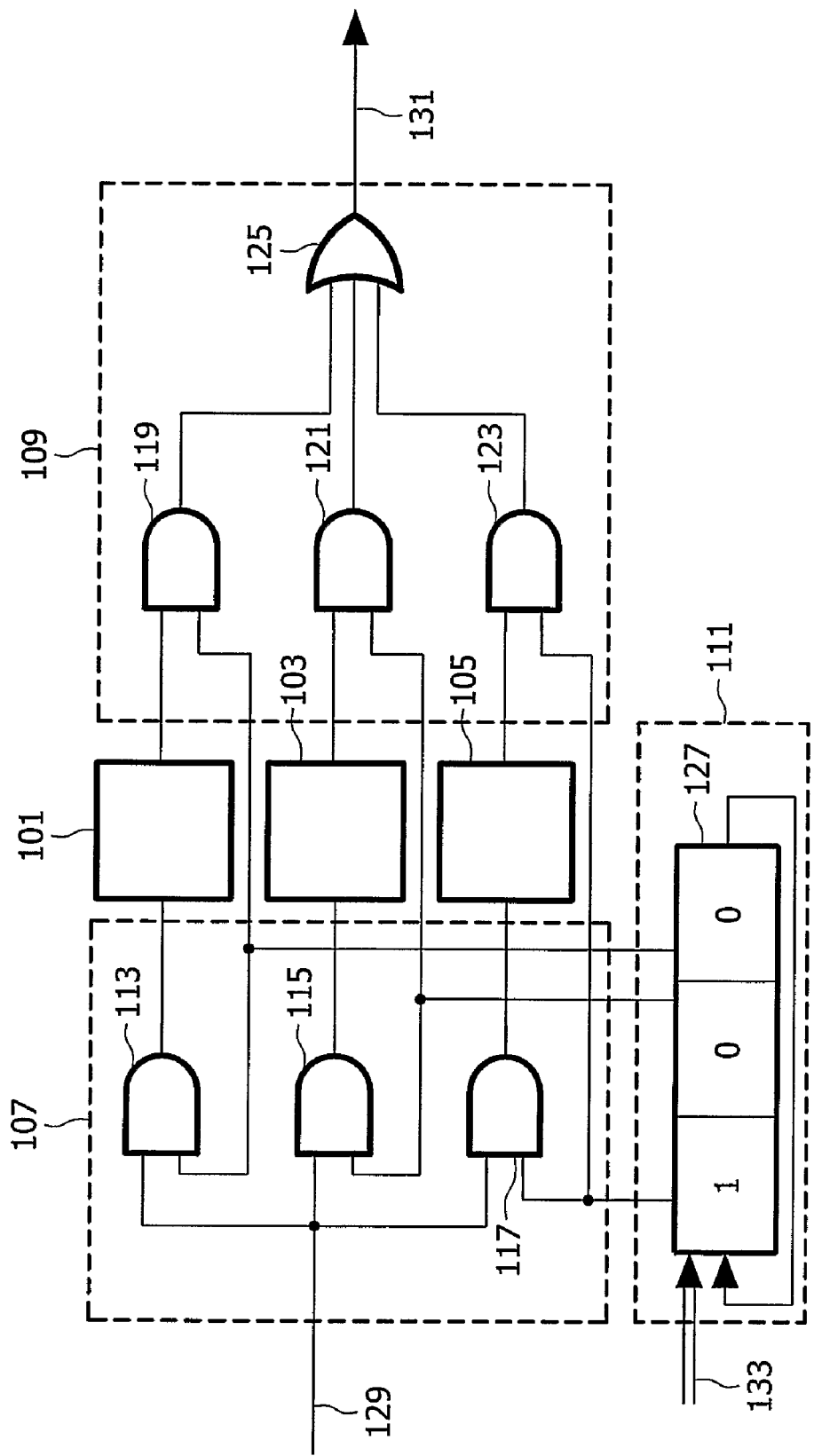
FIG. 1 shows an electronic circuit according to the invention.
Figure 3:
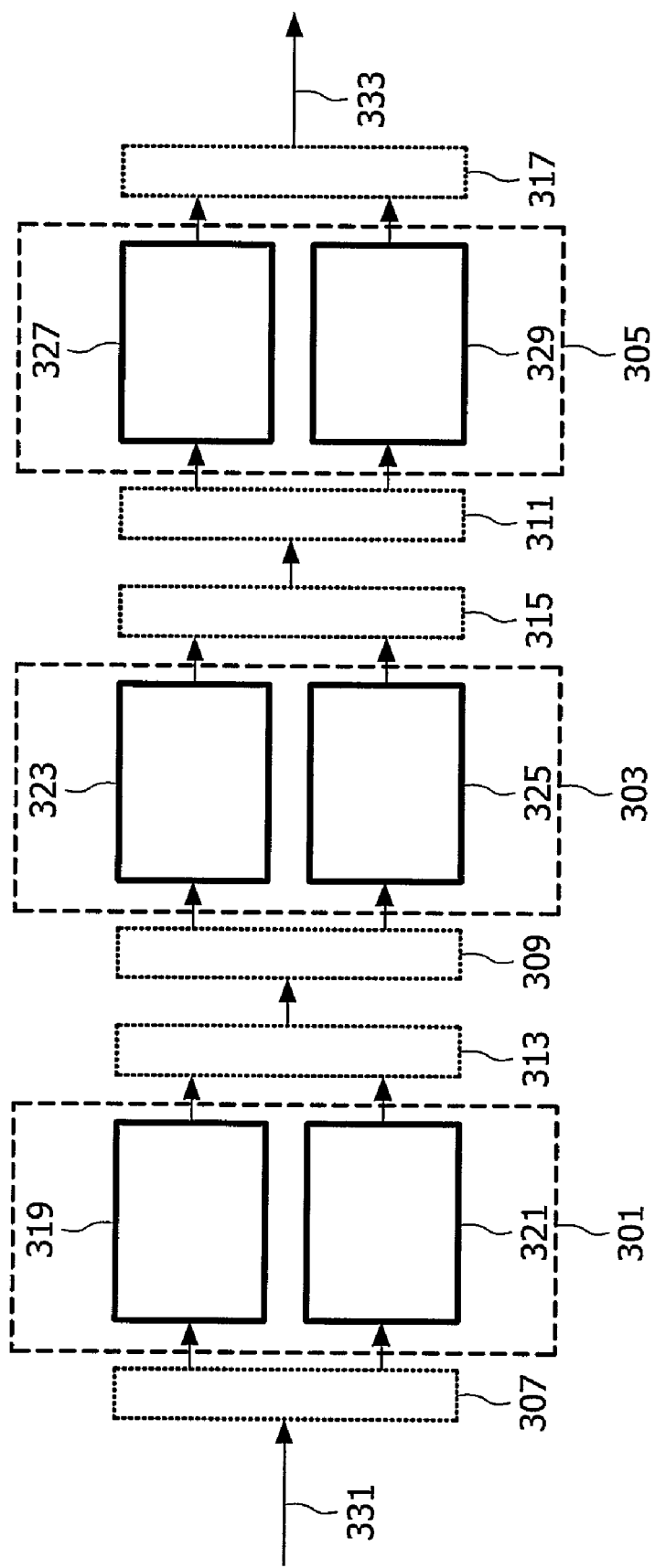
FIG. 3 shows a further electronic circuit according to the invention.

FIG. 1 shows an electronic circuit according to the invention, comprising a set of combinatorial logical circuits 101, 103 and 105, a splitter circuit 107, a merger circuit 109 and a selection circuit 111. The electronic circuit may also comprise more combinatorial logical circuits, and/or storage elements for storing data produced by a combinatorial logical circuit. Splitter circuit 107 comprises AND gates 113, 115 and 117. Merger circuit 109 comprises AND gates 119, 121 and 123, and an OR gate 125. The selection circuit 111 comprises a shift register 127 that comprises three registers, equal to the number of combinatorial logical circuits. Combinatorial logical circuits 101, 103 and 105 perform logic operations on input data 129 and produce output data 131. The input data 129 can both be data generated by the electronic circuit itself, for example by another combinatorial logical circuit of the electronic circuit, as well as data received from outside the electronic circuit. The output data 131 can both be output to the electronic circuit itself, for example to another logical circuit of the electronic circuit, as well as to outside the electronic circuit. The logical operations that are implemented by each of the combinational logic circuits 101-105 result in the same functional behavior, i.e. independent whether the input data 129 are processed by combinational logic circuit 101, or 103 or 105, the output data 131 have the same functional relation to the input data 129 In operation, the shift register 127 holds a bit value of one in one of its registers, for example in the first register as shown in FIG. 1, and a bit value of zero in the other two registers. Upon receiving a clock signal 133 the bit values stored in the registers of shift register 127 shift one position, where the bit value stored in the last register is shifted to the first register, as indicated by the arrow in FIG. 1. The clock signal 133 is generated by a clock generator, for example, not shown in FIG. 1. In case the first register of the shift register 127 holds a bit value equal to one, and the other two registers hold a bit value equal to zero, as shown in FIG. 3, a first port of AND gate 117 as well as a first port of AND gate 123 receive a bit value equal to one, whereas a first port of AND gates 113, 115, 119 and 121 receive a bit value equal to zero. The input value 129, for example a 32-bit value, is put on the second input port of AND gates 113-117. As a result, combinatorial logical circuit 105 receives data equal to input data 129, whereas combinatorial logical circuits 101 and 103 receive data equal to zero, i.e. all bit values are equal to zero. Combinatorial logical circuit 105 processes the input data 129 and produces output data, while combinational logic circuits 101-103 do not perform logic operations since their input data are equal to zero. AND gate 123 outputs the data produced by combinatorial logical circuit 105 to OR gate 125, whereas AND gates 119 and 121 output bit values equal to zero to OR gate 125. OR gate 125 outputs the data produced by combinatorial logical circuit 105 as output data 131. By shifting the bit value equal to one in the shift register 127 for one position, using clock signal 133, combinatorial logical circuit 103 is selected for processing input data 129 and producing output data 131, and by shifting the bit value equal to one another time, combinatorial logical circuit 101 is selected. By shifting the bit value equal to one yet another time, combination logical circuit 105 is selected again. As a result, over time a different one of the three combinatorial logical circuits 101-105 processes the input data 129 and produces output data 131.

Figure 2:
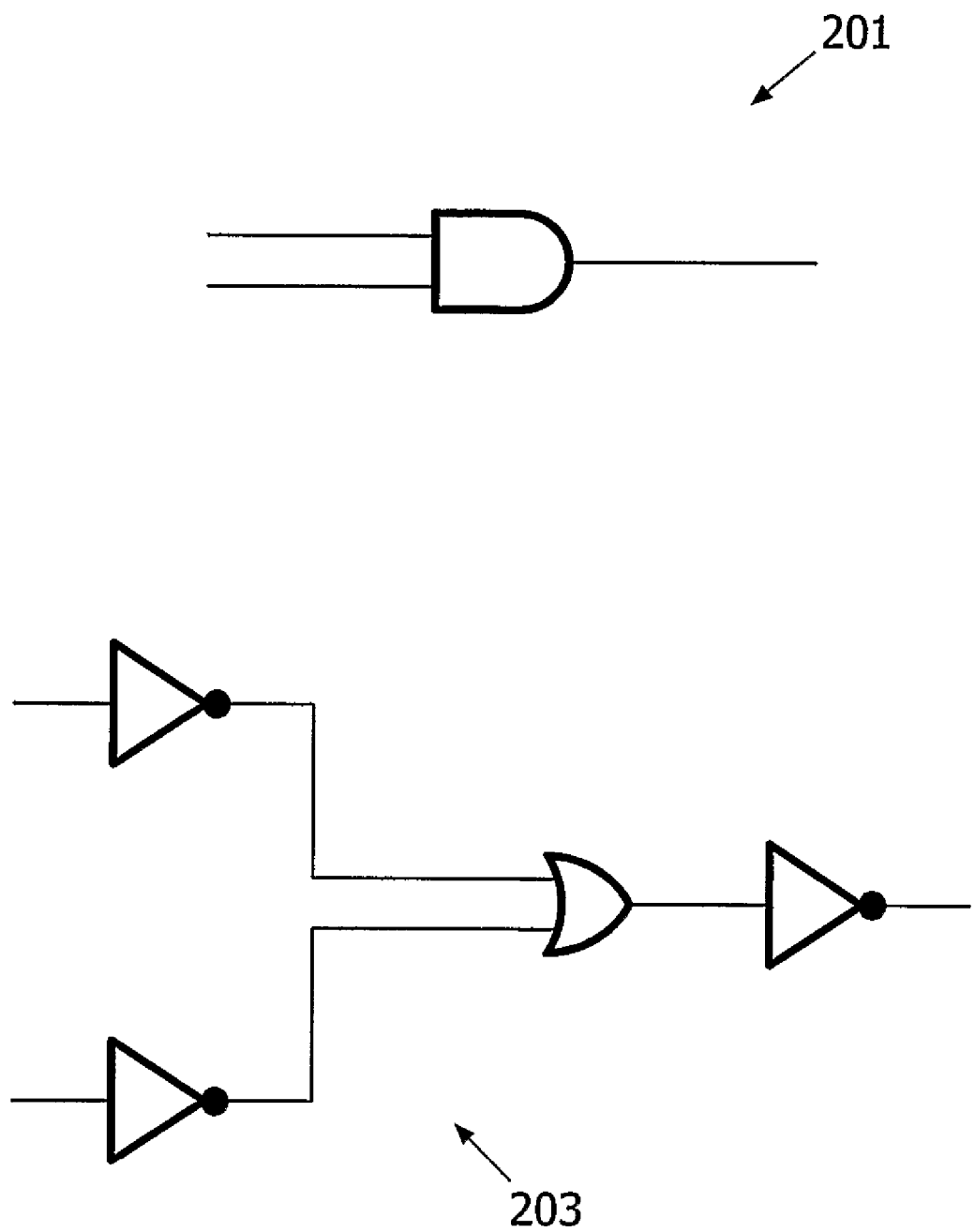
FIG. 2 shows two combinatorial logical circuits implementing the same functional behavior.

The combinatorial logical circuits 101-105 each perform a different set of logical operations such that the functional relation between output data 131 and input data 129 is identical. The functional relation between output data 131 and input data 129 can be characterized by means of a mathematical function $f$ over input data 129. However, the same functional relation can also be achieved by means of another mathematical function g over input data 129. More formally, for a set P of possible input data 129, the following holds: ($\exists_g$: ($\forall_{p \in P}$: $f(p)=g(p)$)). For example, functions $f(a, b)=a \wedge b$ and $g(a, b)=\neg(\neg a \vee \neg b)$ result in the same functional relation between input parameters a and b, and the output parameter. Function $f$ performs the logical operation AND on input parameters a and b, whereas function g performs three logical operations NOT and logical operation OR on input parameters a and b, i.e. a different set of logical operations. Another example are functions $f(a, b, c)=(a+b)*c$ and $g(a, b, c)=(a*c)+(b*c)$. Function $f$ performs one logical operation ADD and one logical operation MULTIPLY on input parameters a and b, whereas function g performs one logical operation ADD and two logical operation MULTIPLY on input parameters a and b, i.e. a different set of logical operations. Though the different sets of logical operations implement the same functional behavior, they result in a different physical implementation of functions $f$ and g, respectively. FIG. 2 shows the physical implementation of functions $f(a, b)=a \wedge b$ and $g(a, b)=\neg(\neg v \neg b)$, as combinatorial logical circuits 201 and 203, respectively. Function $f$ is performed using an AND gate, whereas function g is performed using three NOT gates and an OR gate. As will be understood by the person skilled in the art, when processing identical input parameters a and b, the level of power consumption over time is different for combinatorial logical circuit 201 compared to combinatorial logical circuit 203. It is noted that some logical operations are in fact a set of logical operations themselves, implemented by a corresponding set of gates. For example, the AND operation is a combination of a NAND operation, implemented by a NAND gate, and a NOT operation, implemented by a NOT gate. Another example is the ADD operation, which typically consists of two XOR, two AND, and one OR operation, implemented by corresponding gates. However, different implementations of the ADD operation are possible, i.e. using a different set of logical operations and corresponding logical gates. So, in case of the function $f(a, b)=a+b$ that performs an ADD operation on parameters a and b, two combinatorial logical circuits can implement function $f$ by using a different set of logical operations to perform the ADD operation, resulting in a different physical implementation of the same function $f$, and hence a different level of power consumption over time when processing identical input data. By switching between combinatorial logical circuits 101-105 during processing of input data, it will be much harder to derive information from measured power consumption profiles, since these profiles are different for the different combinatorial logical circuits, even when processing identical input data. In this way the level of protection of the electronic circuit against power analysis attacks is increased. For example, the set of combinatorial logical circuits 101-105 can be used to implement that part of the functional behavior of a cryptographic system that deals with handling of information that should be kept secret.

In an alternative embodiment, the sets of logical operations used by different combinatorial logical circuits may be identical, but having a different topology, i.e. interconnect structure. In case of combinatorial logical circuits using an identical set of logical operations, but having a different topology, processing of identical input values will result in different power consumption profiles as well. In a further alternative embodiment, different combinatorial logical circuits may use both different sets of logical operations as well as a different topology.

In a further alternative embodiment, the set of combinatorial logical circuits comprises a different number of combinational logic circuits. In case a larger number of combinational logic circuits is applied, more variation in the power consumption profiles for given input data is achieved, further improving the level of protection against power analysis attacks. In this way the level of protection can be adapted to the requirements. In another alternative embodiment, a different selection circuit is used for selecting one of the logical circuits 101-105, for example a random bit generator generating a multiple-bit value at each clock signal 133, comprising one bit equal to one and the remaining bits equal to zero, where a first bit is used for selecting a first combinatorial logical circuit, a second bit is used for selecting a second combinatorial logical circuit, etcetera.

FIG. 3 shows a further electronic circuit according to the invention, comprising three sets 301, 303 and 305 of combinatorial logical circuits, splitter circuits 307, 309 and 311, and merger circuits 313, 315 and 317. The electronic circuit may also comprise more combinatorial logical circuits, and/or storage elements for storing data produced by a combinatorial logical circuit. The first set 301 comprises combinatorial logical circuits 319 and 321, the second set 303 comprises combinatorial logical circuits 323 and 325, and the third set 305 comprises combinatorial logical circuits 327 and 329. The three sets of combinatorial logical circuits 301-305 perform logical operations on input data 331 and produce output data 333. The function of the splitter circuits is to input data to one of the two combinatorial logical circuits connected to the splitter circuit, and the function of the merger circuits is to output data from one of the combinatorial logical circuits connected to the merger circuit. A possible implementation of the splitter circuit is to have a mask of AND gates that only propagates input data through the AND gate that corresponds to the selected combinatorial logical circuit, as implemented by splitter circuit 107, and a possible implementation of the merger circuit is to have a mask of AND gates that only propagates result data through the AND gate that correspond to the selected combinatorial logical circuit, as implemented by merger circuit 109. Combinatorial logical circuits 319 and 321 implement the same functional behavior, i.e. their output data have the same functional relation to their input data, but they use a mutually different set of logical operations to process input data 331 and to produce output data, which are used as input data for the set 303 of combinatorial logical circuits. Combinatorial logical circuits 323 and 325 implement the same functional behavior, but use a mutually different set of logical operations to process their input data and to produce output data that are used as input data for the set 305 of combinatorial logical circuits. Combinatorial logical circuits 327 and 329 implement the same functional behavior, but use a mutually different set of logical operations to process their input data and to produce output data 333. A selection circuit, not shown in FIG. 3, selects, via the splitter circuits 307-311, one of the two combinatorial logical circuits of each set of combinatorial logical circuits 301-305 to process their corresponding input data. A possible implementation of a selection circuit is a three-bit counter that increases its value at each clock signal, for example '000', '001', '010', '011', '100', etcetera. A first bit is used in selecting one of the combinatorial logical circuits of the first set 301, a second bit is used in selecting one of the combinatorial logical circuits of the second set, and a third bit is used in selecting one of the combinatorial logical circuits of the third set. As there are three sets each having two combinatorial logical circuits, in total eight different combinations of combinatorial logical circuits can be made for processing input data 331 and producing output data 333, resulting in eight different power consumption profiles, even when processing identical input data 331. Hence, by dividing a single set of combinatorial logical circuits used for processing input data 331 into output data 333, into multiple sets of combinatorial logical circuits for processing input data 331 into output data 333, it will be much harder to derive information from measured power consumption profiles.

In an alternative embodiment, each set of combinatorial logical circuits may comprise a different number of combinatorial logical circuits, and/or a given combinatorial logical circuit can be divided into a different number of sets of combinatorial logical circuits. By increasing the number of combinatorial logical circuits for one set, or by increasing the number of sets of combinatorial logical circuits for a given combinatorial logical circuit, more variation in power consumption profiles is obtained for given input data.

Figure 4:
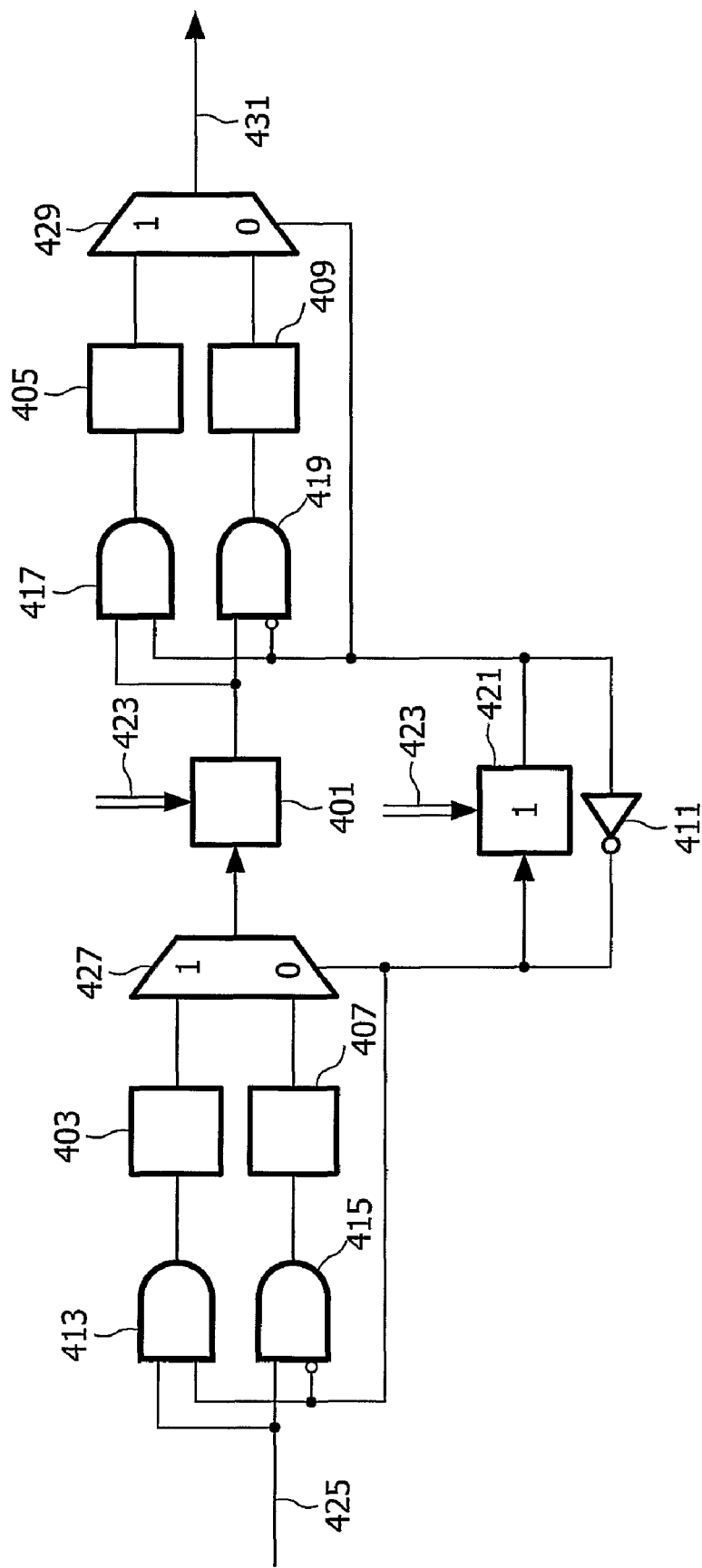
FIG. 4 shows an alternative further electronic circuit according to the invention.

FIG. 4 shows an embodiment of an alternative further electronic circuit according to the invention, comprising a storage element 401 for storing data, for example a 32 bit value, under control of a clock signal 423, a first set of an encoder 403 and a corresponding decoder 405, a second set of an encoder 407 and a corresponding decoder 409, a NOT gate 411, AND gates 413 and 417, and AND gates 415 and 419 with an inverted input on their first input port, as indicated by the open circle representing a NOT gate. The electronic circuit also comprises a register 421 storing a bit value under control of the clock signal 423. The electronic circuit further comprises a combinational logic circuit, not shown, that produces data 425, to be stored in storage element 401. The electronic circuit may also comprise more combinatorial logical circuits, and/or storage elements for storing data produced by a combinatorial logical circuit. Data 425 is stored in the storage element 401 and is used, for example, for further processing or output outside the electronic circuit. The storage element 401 can be latches, i.e. known circuits that pass data elements from their inputs to their outputs when the clock signal 423 has a first value and hold the output data when the clock signal 423 has a second value. Alternatively, different circuits such as flip-flops can be applied, that hold data on an edge of a clock signal 423. The encoder 403 and corresponding decoder 405, as well as the encoder 407 and corresponding decoder 409, implement an encoding function e and a decoding function d, respectively, such that for all possible data P to be stored in storage element 401 holds: $\forall_{p \in P}: d(e(p))=p$. However, the encoding function that is implemented by encoder 403 is different from that implemented by encoder 407, and therefore the decoding function that is implemented by decoder 405 is different from that implemented by decoder 409. An example of a simple encoding function is the rotation of bits, or inversion of the bit values. In operation, a bit value equal to zero or a bit value equal to one are alternating, or in an alternative embodiment randomly, stored in register 421, upon clock signal 423. In case a bit value equal to one is stored in register 421, as shown in FIG. 4, via NOT gate 411, a value equal to one is put on the first input port of AND gate 415, and a value equal to zero is put on the first input port of AND gate 419. A value equal to one is put on a first input port of AND gate 417 and a value equal to zero is put on the first input port of AND gate 413, via the NOT gate 411. On the second input ports of AND gate 413 and NAND gate 415 data value equal to data 425 is put. As a result, encoder 407 receives data 425 as input data, while encoder 403 receives a data value equal to zero, i.e. all bit values equal to zero, as input. Encoder 407 encodes the received data, while encoder 403 performs no operation since its input data are equal to zero. Multiplexer 427 selects, under control of the bit value stored in register 421, the output of encoder 407 for receiving the encoded data, and these encoded data are stored in storage element 401. Upon a next clock signal 423, a bit value equal to zero is stored in register 421. Encoder 403 receives data 425, encodes these data and the encoded data are stored in storage element 401. The encoded data stored in the storage element upon the previous clock cycle, are retrieved from the storage element and received by decoder 409, since AND gate 419 has a value equal to one on its first input port and AND gate 417 has a value equal to zero on its first input port. Decoder 409 decodes the encoded data and these decoded data are output as output data 431 via multiplexer 429, under control of the bit value stored in register 421, while decoder 405 performs no operation. These output data 431 are equal to the data 425 stored in storage element 401 during the previous clock cycle, since these data were encoded by encoder 407 and decoded by the corresponding decoder 409. Accordingly, data 425 that are encoded by encoder 403 and subsequently stored in storage element 401, are always decoded by decoder 405. As a result, the encoding and decoding of data stored in the storage element 401 does not change the functional behavior of the electronic circuit. However, by using the two different encoding functions implemented by encoder 403 and 407, respectively, storing of identical data 425 in storage element 401 will result in a different power consumption profile, since these encoded values of data 425 are different. By switching between the two encoding schemes implemented by encoder 403 and 407, respectively, during storing of data, it will be much harder to derive information from measured power consumption profiles, since these profiles are different when storing data in the storage element, even when storing identical data.

In an alternative embodiment, three or more sets of an encoder and a corresponding decoder are combined with a storage element, each encoder having a unique encoding function, resulting in a larger variation of the power consumption profiles for identical data to be stored in storage element 401. In another alternative embodiment, data 425 is stored in storage element 401 either without performing any encoding, or after encoding of the data prior to storing followed by decoding of the data after retrieval from the storage element. In a further alternative embodiment, the storage element 401 is arranged to store encoded data values that are wider, i.e. have a larger number of bits, than the data 425, which allows in more freedom in selecting proper encoding and decoding functions. For example, the encoder maps a 32-bit data value to a 48-bit data value, which is stored in the storage element 401, and the decoder maps the encoded 48-bit value to a 32-bit decoded value.

Figure 5:
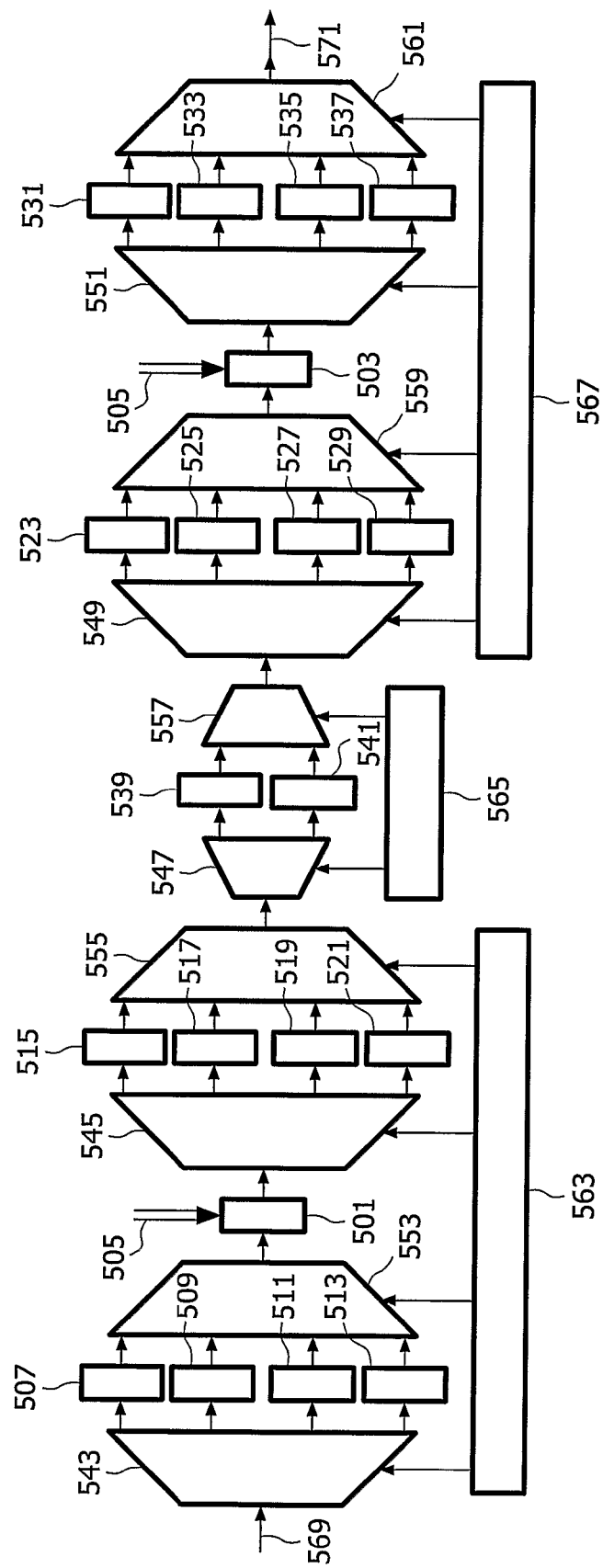
FIG. 5 shows another alternative further electronic circuit according to the invention.

FIG. 5 shows another alternative further electronic circuit according to the invention, comprising two storage elements 501 and 503 for storing data, for example a 32-bit value, under control of a clock signal 505. The electronic circuit further comprises four sets of encoders 507-513 and corresponding decoders 515-521, respectively, as well as another four sets of encoders 523-529 and corresponding decoder 531-537, respectively. The electronic circuit also has logical circuits 539-541, splitter circuits 543-551, merger circuits 553-561, and selection circuits 563-567. The splitter circuits send data from their input port to one of their output ports, while the merger circuits receive data on one of their input ports and output these data on their output port. A possible implementation of the splitter circuit 547, merger circuit 557 and selection circuit 565 is shown in FIG. 1. A possible implementation of splitter circuits 543-545 and 549-551 as well as merger circuits 553-555 and 559-561 is by using multiplexers, under control of corresponding selection circuits 563 and 567. The electronic circuit may also comprise more logical circuits, and/or storage elements for storing data produced by a logical circuit. The logical circuits 539-541 perform logical operations on input data 569 and produce output data 571. Logical circuits 539 and 541 implement the same functional behavior, i.e. their output data have the same functional relation to their input data, but they use a different set of logical operations to process input data 569 and to produce output data 571. Each encoder and corresponding decoder, implement an encoding function e and a decoding function d, respectively, such that for all possible data P to be stored in storage element 501 and 503, respectively, holds: $\forall_{p \in P}$: $d(e(p))=p$. However, the encoding functions implemented by encoders 507-513 are mutually different, and the encoding functions implemented by encoders 523-529 are mutually different as well. In operation, selecting circuit 563 selects one of the encoders 507-513, via splitter circuit 543 and merger circuit 553, to encode the input data 569 prior to storage in storage element 501. The corresponding decoder from decoders 515-521, selected by selecting circuit 563, via splitter circuit 545 and merger circuit 555, subsequently decodes these data. Selecting circuit 565 selects one of the combinatorial logical circuits 539-541 to perform logical operations on the data retrieved from storage element 501, and the output data are encoded by one of the encoders 523-529, selected by selecting circuit 567. The encoded data are stored in storage element 503, subsequently decoded by the corresponding decoder of the decoders 531-537, selected by selecting circuit 567, and output as output data 571. The selecting circuits 563-567 work independently from each other, and therefore 32 different combinations of encoding/decoding of input data 569, processing of input data 569 and encoding/decoding of output data 571 are possible, resulting in as many mutually different power consumption profiles. Therefore, the combination of processing input data by either one of multiple combinatorial logical circuits, and encoding data before storing in a storage element dramatically increases the level of protection against power analysis attacks.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an"

preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An electronic circuit for cryptographic processing, comprising:
    a first combinatorial logical circuit, having an input, arranged to perform a first set of logical operations on an input data at the input and to produce a corresponding first output data, the first output data having a first functional relation to the input data for said input data within a given range, and
    a second combinatorial logical circuit, having an input, arranged to perform a second set of logical operations on an input data at said input and to produce a corresponding second output data, the second output data having a second functional relation to the input data, said second functional relation identical to said first functional relation for said input data within said given range,
    wherein the first set of logical operations is different from the second set of logical operations, and
    a selector for receiving a given input data and dynamically selecting from among the first combinatorial logical circuit for performing the first set of logical operations on the given input data and the second combinatorial logical circuit for performing the second set of logical operations on the given input data and producing output data, and
    wherein the selecting includes inputting the given input data to the input of the selected one of the first and second combinatorial logical circuits and outputting a selected first cryptographic processing output, the selected first cryptographic processing output being the output of the selected one of the first and second combinatorial logical circuits.

2. The electronic circuit of claim 1, further comprising:
    a third combinatorial logical circuit, having an input, arranged to perform a third set of logical operations on an input data at said input and to produce a corresponding third output data, the third output data having a third given functional relation to said input data for input data within a given range, and
    a fourth combinatorial logical circuit, having an input, arranged to perform a fourth set of logical operations on an input data at said input and to produce a corresponding fourth output data, the fourth output data having a fourth functional relation to said input data identical to said given third functional relation,
    wherein the third set of logical operations is different from the fourth set of logical operations, and
    a selector for receiving said selected first cryptographic processing output data and dynamically selecting from among the third combinatorial logical circuit and the fourth combinatorial logical circuit for performing logical operations on the selected first cryptographic processing output data and producing a second output cryptographic processing data, and
    wherein said selecting includes inputting the selected first cryptographic processing output data to the input of the selected one of the third and fourth combinatorial logical circuits.

3. The electronic circuit of claim 1, wherein the selector comprises:
    a selection circuit for generating a selecting signal to select one combinatorial logical circuit from among the first and second combinatorial logical circuits,
    a splitter circuit for inputting the given input data to one of the first and second combinatorial logical circuits, depending on the selecting signal,
    a merger circuit for outputting data from one of the first and second combinatorial logical circuits, depending on the selecting signal.

4. The electronic circuit of claim 3, further comprising a timing circuit to determine the points in time at which the selection circuit generates the selecting signal to select one of the first and second combinatorial logical combinatorial logical circuits.

5. An electronic circuit for cryptographic processing, comprising:
    a combinatorial logical circuit to perform logical operations on input data and to produce an output data,
    a storage circuit for storing the output data produced by the combinatorial logical circuit,
    wherein the storage circuit comprises
    a first encoding means for encoding the output data into a first encoded output data,
    a storage element for retrievably storing the first encoded output data,
    a corresponding first decoding means, arranged for decoding the first encoded output data into said output data after retrieving the first encoded output data from the storage element, and
    wherein the electronic circuit is arranged to dynamically control the activation of the first encoding means and the corresponding first decoding means.

6. The electronic circuit of claim 5, wherein the storage circuit further comprises:
    a second encoding means for encoding the output data into a second encoded output data for storing in the storage element,
    a corresponding second decoding means, arranged for decoding the second encoded output data into said output data after retrieving the second encoded output data from the storage element,
    wherein the encoding of the first output data is different from the encoding of the second output data, and
    wherein the electronic circuit is further arranged to generate a selecting signal to dynamically select from among the first encoding means and its corresponding first decoding means and the second encoding means and its corresponding second decoding means, for encoding and decoding of the output data.

7. The electronic circuit of claim 6, further comprising a timing circuit to determine the points in time at which the electronic circuit selects one from among the first and second encoding means and corresponding first and second decoding means.

8. The electronic circuit of claim 6, wherein the combinatorial logical circuit comprises:
    a first combinatorial logical circuit, having an input, arranged to perform a first set of logical operations on input data at the input and to produce a corresponding first cryptographic output data, the first cryptographic output data having a given first functional relation to the input data for said input data within a given range, and
    a second combinatorial logical circuit, having an input, arranged to perform a second set of logical operations on input data at said input and to produce a corresponding second cryptographic output data, the second cryptographic output data having a functional relation to the input data identical to the given first functional relation for said input data within said given range,
wherein the first set of logical operations is different from the second set of logical operations, and
a selector for receiving an input data and dynamically selecting from among the first combinatorial logical circuit and the second combinatorial logical circuit for performing logical operations on the given input data and producing output data, and
wherein the selecting includes inputting the input data to the input of the selected one of the first and second combinatorial logical circuits and outputting a selected output, the selected output being the output of the selected one of the first and second combinatorial logical circuits.

9. A method of processing cryptographic data, comprising:
using a set of logical operations for processing input data and producing output data,
storing the output data in a storage element, wherein the storing comprises:
encoding the output data into an encoded output data,
storing the encoded output data in the storage element,
retrieving the encoded output data from the storage element,
decoding the encoded output data retrieved from the storage element, and
dynamically controlling the encoding of the output data into an encoded output data and the corresponding decoding of the encoded output data retrieved from the storage element.

10. A cryptographic device comprising an electronic circuit according to claim 1.

11. The electronic circuit of claim 1, wherein the selector includes:
a first mask circuit for selectively masking and not masking, based on the signal, the given input data for input to the first combinatorial logical circuit, and
a second mask circuit for selectively masking and not masking, based on the signal, the given input data for input to the second combinatorial logical circuit.

12. The electronic circuit of claim 8, wherein the selector includes:
a first mask circuit to selectively mask and not mask, based on the signal, the given input data and to input the selected masked and not masked given input data to the first combinatorial logical circuit, and
a second mask circuit to selectively mask and not mask, based on the signal, to input the selected masked and not masked given input data to the second combinatorial logical circuit.

13. The electronic circuit of claim 12,
wherein the first mask circuit includes an AND mask configured to mask and to not mask the given input data by inputting to the first combinatorial logical circuit a selection between all zeros and the given input data, respectively and
wherein the second mask circuit includes an AND mask configured to mask and to not mask the given input data by inputting to the second combinatorial logical circuit a selection between all zeros and the given input data, respectively.

14. The electronic circuit of claim 1, wherein the selector includes an OR merger circuit to receive the output of the first combinatorial logical circuit and to receive the output of the second combinatorial logic circuit, and to output, as the selected output, a logical OR of the output of the first combinatorial logical circuit and the output of the second combinatorial logic circuit.

15. A method of processing cryptographic data, comprising:
generating a mode signal having one of a given plurality of states;
receiving a given input data and generating a cryptographic processed data output, said generating including:
generating a first input data, wherein the first input data is a selected one of a mask of the given input data and a not mask of the given data, the selection based on the state of the mode signal;
generating a second input data, wherein the second input data is the other of the mask of the given input data and the not mask of the given data,
performing a first set of logical operations on the first input data to generate a first output data, the first set of logical operations embodying a given input-output function,
performing a second set of logical operations on the second input data to generate a second output data, the second set of logical operations being different than the first set of logical operations and the second set of logical operations embodying the same given input-output function, and
merging the first output data and the second output data to generate the cryptographic data output;
repeating said generating a mode signal to have a different one of the given plurality of states; and
repeating said receiving a given input data and generating a cryptographic processed data output.

16. The electronic circuit of claim 1,
wherein the first combinatorial logical circuit comprises a first configuration of logical gates receiving a given power supply current, having an input, arranged to receive an input data A at said input and generate a cryptographic output data=$f(A)$, $f$ being a given function, by performing $f(A)$ as a first set of logical operations on said first configuration of logical gates,
wherein said first configuration and said first set of logical operations are configured to generate a first power consumption profile when performing $f(A)$, and
wherein the first combinatorial logical circuit comprises a second configuration of logical gates receiving a given power supply current, having an input, arranged to receive an input data A at said input and generate a cryptographic output data=$g(A)$, g being a given function, wherein $g(A)=f(A)$ for all A in a given range of A, by performing $g(A)$ as a second set of logical operations on said second configuration of logical gates, and
wherein said second configuration and said second set of logical operations are configured to generate a second power consumption profile when performing $g(A)$ different from the first power consumption profile in performing $f(A)$.

17. The electronic circuit of claim 16,
wherein the selector is configured for receiving a given input data A and dynamically selecting from among the first combinatorial logical circuit for performing said $f(A)$=the cryptographic output data and the second combinatorial logical circuit for performing said $g(A)$=the cryptographic output data and producing a selected cryptographic output data as a selected on of either of $f(A)$ and $g(A)$, based said dynamic selecting.

18. The electronic circuit of claim 1,
wherein the first combinatorial logical circuit comprises a first configuration of AND, OR and NOT logical gates receiving a given power supply current, having an input, arranged to receive an input data A at said input and generate a cryptographic output data=$f(A)$, $f$ being a given function, by performing $f(A)$ as a first set of logical AND, OR and NOT operations on said first configuration of AND, OR and NOT logical gates, and
wherein the second combinatorial logical circuit comprises a second configuration of AND, OR and NOT logical gates receiving a given power supply current, having an input, arranged to receive an input data A at said input and generate a cryptographic output data=$g(A)$, g being a given function, wherein $g(A)=f(A)$ for all A in a given range of A, by performing $g(A)$ as a second set of logical AND, OR and NOT operations on said second configuration of AND, OR and NOT logical gates, and
wherein said second configuration and said second set of logical AND, OR and NOT operations are different from said first configuration and said first set of logical AND, OR and NOT operations.

19. The electronic circuit of claim 18,
wherein the selector is configured to receive the given input data A and dynamically select from among the first combinatorial logical circuit for performing said $f(A)$= the cryptographic output data and the second combinatorial logical circuit for performing said $g(A)$=the cryptographic output data and to produce a selected cryptographic output data as a selected one of $f(A)$ and $g(A)$, based on said dynamic selecting.

20. The electronic circuit of claim 19,
wherein the first combinatorial logical circuit comprises a first configuration of AND, OR and NOT logical gates receiving a given power supply current, having an input, arranged to receive an input data A at said input and generate a cryptographic output data=$f(A)$, $f$ being a given function, by performing $f(A)$ as a first set of logical AND, OR and NOT operations on said first configuration of AND, OR and NOT logical gates, wherein said first configuration and said first set of logical AND, OR and NOT operations are configured to generate a first power consumption profile when performing $f(A)$, and
wherein the second combinatorial logical circuit comprises a second combinatorial logical circuit comprising a second configuration of AND, OR and NOT logical gates receiving a given power supply current, having an input, arranged to receive an input data A at said input and generate a cryptographic output data=$g(A)$, g being a given function, wherein $g(A)=f(A)$ for all A in a given range of A, by performing $g(A)$ as a second set of logical AND, OR and NOT operations on said second configuration of AND, OR and NOT logical gates, and
wherein said second configuration and said second set of logical AND, OR and NOT operations are different from said first configuration and said first set of logical AND, OR and NOT operations and wherein said second configuration and said second set of logical AND, OR and NOT operations are configured to generate a second power consumption profile when performing $g(A)$ and, wherein, for a given A, the first power consumption profile in performing $f(A)$ is different from the second power consumption profile in performing $g(A)$.

21. The electronic circuit of claim 2,
wherein the first combinatorial logical circuit comprises a first configuration of AND, OR and NOT logical gates receiving a given power supply current, having an input, arranged to receive an input data A at said input and generate a cryptographic output data=$f(A)$, $f$ being a given function, by performing $f(A)$ as a first set of logical AND, OR and NOT operations on said first configuration of AND, OR and NOT logical gates, wherein said first configuration and said first set of logical AND, OR and NOT operations are configured to generate a first power consumption profile when performing $f(A)$,
wherein the second combinatorial logical circuit comprises a second combinatorial logical circuit comprising a second configuration of AND, OR and NOT logical gates receiving a given power supply current, having an input, arranged to receive an input data A at said input and generate a cryptographic output data=$g(A)$, g being a given function, wherein $g(A)=f(A)$ for all A in a given range of A, by performing $g(A)$ as a second set of logical AND OR and NOT operations on said second configuration of AND, OR and NOT logical gates, and
wherein said second configuration and said second set of logical AND, OR and NOT operations are different from said first configuration and said first set of logical AND, OR and NOT operations,
wherein said second configuration and said second set of logical AND, OR and NOT operations are configured to generate a second power consumption profile when performing $g(A)$ and, wherein, for a given A, the first power consumption profile in performing $f(A)$ is different from the second power consumption profile in performing $g(A)$,
wherein the third combinatorial logical circuit comprises a third configuration of AND, OR and NOT logical gates receiving a given power supply current, having an input, arranged to receive an input data B at said input and generate a cryptographic output data=$f1(B)$, $f1$ being a given function, by performing $f1(B)$ as a third set of logical AND, OR and NOT operations on said third configuration of AND, OR and NOT logical gates,
wherein said third configuration and said third set of logical AND, OR and NOT operations are configured to generate a third power consumption profile when performing $f1(A)$, and
a fourth combinatorial logical circuit comprising a fourth configuration of AND, OR and NOT logical gates receiving a given power supply current, having an input, arranged to receive an input data B at said input and generate a cryptographic output data,
wherein said cryptographic output data=$g1(B)$, g1 being a given function, wherein $g1(B)=f1(B)$ for all B in a given range of B, by performing $g1(B)$ as a fourth set of logical AND, OR and NOT operations on said fourth configuration of AND, OR and NOT logical gates,
wherein said fourth configuration and said fourth set of logical AND, OR and NOT operations are different from said third configuration and said third set of logical AND, OR and NOT operations,
wherein said fourth configuration and said fourth set of logical AND, OR and NOT operations are configured to generate a fourth power consumption profile when performing $g1(B)$ and,
wherein, for a given B, the third power consumption profile in performing $f1(B)$ is different from the fourth power consumption profile in performing $g1(B)$.

\* \* \* \* \*